United States Patent
Wang et al.

(10) Patent No.: US 9,628,486 B2
(45) Date of Patent: Apr. 18, 2017

(54) ACCESS CONTROL FOR DATA BLOCKS IN A DISTRIBUTED FILESYSTEM

(71) Applicant: Vormetric, Inc., San Jose, CA (US)

(72) Inventors: I-Ching Wang, San Jose, CA (US); Feng Xu, San Jose, CA (US); Sri Sudarsan, San Jose, CA (US)

(73) Assignee: Vormetric, Inc., San Jose, CA (US)

( * ) Notice: Subject to any disclaimer, the term of this patent is extended or adjusted under 35 U.S.C. 154(b) by 71 days.

(21) Appl. No.: 14/522,365

(22) Filed: Oct. 23, 2014

(65) Prior Publication Data

US 2016/0119349 A1    Apr. 28, 2016

(51) Int. Cl.
*H04L 29/06* (2006.01)
*G06F 17/30* (2006.01)
*H04L 9/08* (2006.01)
*G06F 21/62* (2013.01)

(52) U.S. Cl.
CPC ........ *H04L 63/10* (2013.01); *G06F 17/30194* (2013.01); *G06F 21/6218* (2013.01); *H04L 9/088* (2013.01); *H04L 9/0816* (2013.01); *H04L 63/06* (2013.01); *H04L 63/20* (2013.01); *H04L 2209/24* (2013.01)

(58) Field of Classification Search
CPC ... H04L 63/10; H04L 9/0816; H04L 2209/24; H04L 9/088; G06F 17/30194; G06F 21/6218
See application file for complete search history.

(56) References Cited

U.S. PATENT DOCUMENTS

| 6,556,998 | B1 | 4/2003 | Mukherjee et al. |
| 7,441,042 | B1 * | 10/2008 | Sallam ............... G06F 9/546 707/999.01 |
| 7,917,751 | B2 | 3/2011 | Keohane et al. |
| 7,930,487 | B1 | 4/2011 | Faibish et al. |
| 8,504,529 | B1 * | 8/2013 | Zheng ............ G06F 17/30091 707/679 |

(Continued)

OTHER PUBLICATIONS

Hue et al., ("An Efficient Fine-grained Access Control mechanism for database outsourcing service", Aug. 2012, International Conference on Information Security and Intelligence Control, pp. 65-69.*

(Continued)

*Primary Examiner* — Kenneth Chang
(74) *Attorney, Agent, or Firm* — Womble Carlyle Sandridge & Rice LLP

(57) ABSTRACT

A method for access control of data in a filesystem is provided. The method includes storing a map in a server, the map coupled to an agent, the map associating access control rules, filenames in a namespace in a first filesystem, and owners of files. The method includes determining a block filename in a namespace in a second filesystem, based on an I/O request from a data node to the second filesystem regarding a data block. The method includes determining a username of the I/O request and determining a filename in the namespace in the first filesystem, based on the block filename in the namespace in the second filesystem. The method includes applying to the data block and the username an access control rule that the map associates with an owner of a file having the filename in the namespace in the first filesystem.

20 Claims, 8 Drawing Sheets

(56) References Cited

U.S. PATENT DOCUMENTS

| | | | | |
|---|---|---|---|---|
| 8,935,751 B1* | 1/2015 | Cardente | ............ | G06F 21/6218 |
| | | | | 709/229 |
| 9,130,920 B2 | 9/2015 | Pelykh | | |
| 2002/0019936 A1* | 2/2002 | Hitz | ........................ | G06F 21/41 |
| | | | | 713/165 |
| 2005/0021562 A1* | 1/2005 | Idei | ........................ | G06F 3/0605 |
| 2006/0010323 A1* | 1/2006 | Martin | ........................ | H04L 9/30 |
| | | | | 713/171 |
| 2008/0060080 A1* | 3/2008 | Lim | ........................ | G06F 21/62 |
| | | | | 726/26 |
| 2010/0235396 A1* | 9/2010 | Chaurasia | ............ | G06F 21/6218 |
| | | | | 707/784 |
| 2011/0161370 A1* | 6/2011 | Miyamae | ............ | G06F 17/30067 |
| | | | | 707/783 |
| 2013/0117563 A1* | 5/2013 | Grabelkovsky | ..... | G06F 21/6218 |
| | | | | 713/165 |
| 2013/0254246 A1* | 9/2013 | Lipcon | ................ | G06F 12/0866 |
| | | | | 707/823 |
| 2014/0006354 A1* | 1/2014 | Parkison | ............ | G06F 17/30194 |
| | | | | 707/649 |
| 2014/0006465 A1* | 1/2014 | Davis | ................ | G06F 17/30194 |
| | | | | 707/827 |
| 2014/0041053 A1 | 2/2014 | Edwards et al. | | |

OTHER PUBLICATIONS

International Search Report, PCT/US2015/057060, mailed Apr. 8, 2016.

\* cited by examiner

ACCESS CONTROL FOR DATA BLOCKS IN A DISTRIBUTED FILESYSTEM

BACKGROUND

In this era of Big Data, large-scale processing of large amounts of data can be performed on distributed hardware in a distributed filesystem. In a multitenant environment, there is a need for access control of data blocks, so that data belonging to each tenant is secure. Yet, the distributed nature of such a system poses data security challenges. Some operating systems do not interact well with other operating systems in terms of data security. For example, Hadoop can be used as a framework for large-scale processing, in which Hadoop is used as a first operating system for one or more name nodes, and a local operating system is used as a second operating system for one or more data nodes, under which data blocks are stored. One problem in such a distributed filesystem is that often the first operating system is not aware of the owner of the data. This renders access control for data blocks difficult in not impossible. One workaround is to define and apply an encryption key in a local filesystem namespace, but this imposes a burden on the system and the users, and is not transparent to the users. Furthermore, such an encryption key cannot be defined and applied selectively on a basis of individual files at the level of the first filesystem (e.g. HDFS, the Hadoop distributed file system). Administrators in the first filesystem have unrestricted access to unencrypted data, since the super-user has the same identity as the name node process itself. Therefore, there is a need in the art for a solution which overcomes the drawbacks described above.

SUMMARY

In some embodiments, a method for access control of data in a filesystem is provided. The method includes storing a map in a server, the map coupled to an agent executing in the server, the map associating access control rules, filenames in a namespace in a first filesystem, and owners of files. The method includes determining a block filename in a namespace in a second filesystem, based on an I/O (input/output) request from a data node to the second filesystem regarding a data block. The method includes determining a username of the I/O request and determining a filename in the namespace in the first filesystem, based on the block filename in the namespace in the second filesystem. The method includes applying to the data block and the username an access control rule that the map associates with an owner of a file having the filename in the namespace in the first filesystem, wherein at least one action of the method is performed by a processor in the server.

In some embodiments, a tangible, non-transitory, computer-readable media having instructions thereupon which, when executed by a processor, cause the processor to perform a method is provided. The method includes establishing in a data node an I/O (input/output) thread associated with a username and regarding a data block, responsive to an I/O request, the data block having a block filename in a namespace in a local filesystem relative to the data node, the block filename having a pool ID (identifier) and a block ID, which identify the data block. The method includes mapping the block filename in the namespace in the local filesystem to a filename in a further namespace relative to a name node and having a directory structure in a further filesystem. The method includes associating an encryption key and an access control rule to the filename in the further namespace and passing the username from the data node to an agent. The method includes applying, through the agent, the access control rule and the encryption key to the data block and the username.

In some embodiments, a method for access control of data blocks in a filesystem is provided. The method includes pushing a first map from a data security manager to an agent, in a server. The first map having a plurality of access control rules based on users and filenames in a first filesystem. The first map further having one or more encryption keys and associating the one or more encryption keys to the users and the filenames in the first filesystem. The method includes in an I/O (input/output) thread in a data node, sending a username to the agent through an I/O control (IOCTL) call and in the I/O thread, calling to a second filesystem regarding one or more blocks, the second filesystem having a namespace that references blocks by block filenames. The method includes in the agent, intercepting the calling to the second filesystem and obtaining a block filename and determining, through the agent, a filename of a file in the first filesystem corresponding to the block filename in the second filesystem. The method includes applying, through the agent, one of the plurality of access control rules, corresponding to the filename of the file in the first filesystem, against the username from the I/O control call.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
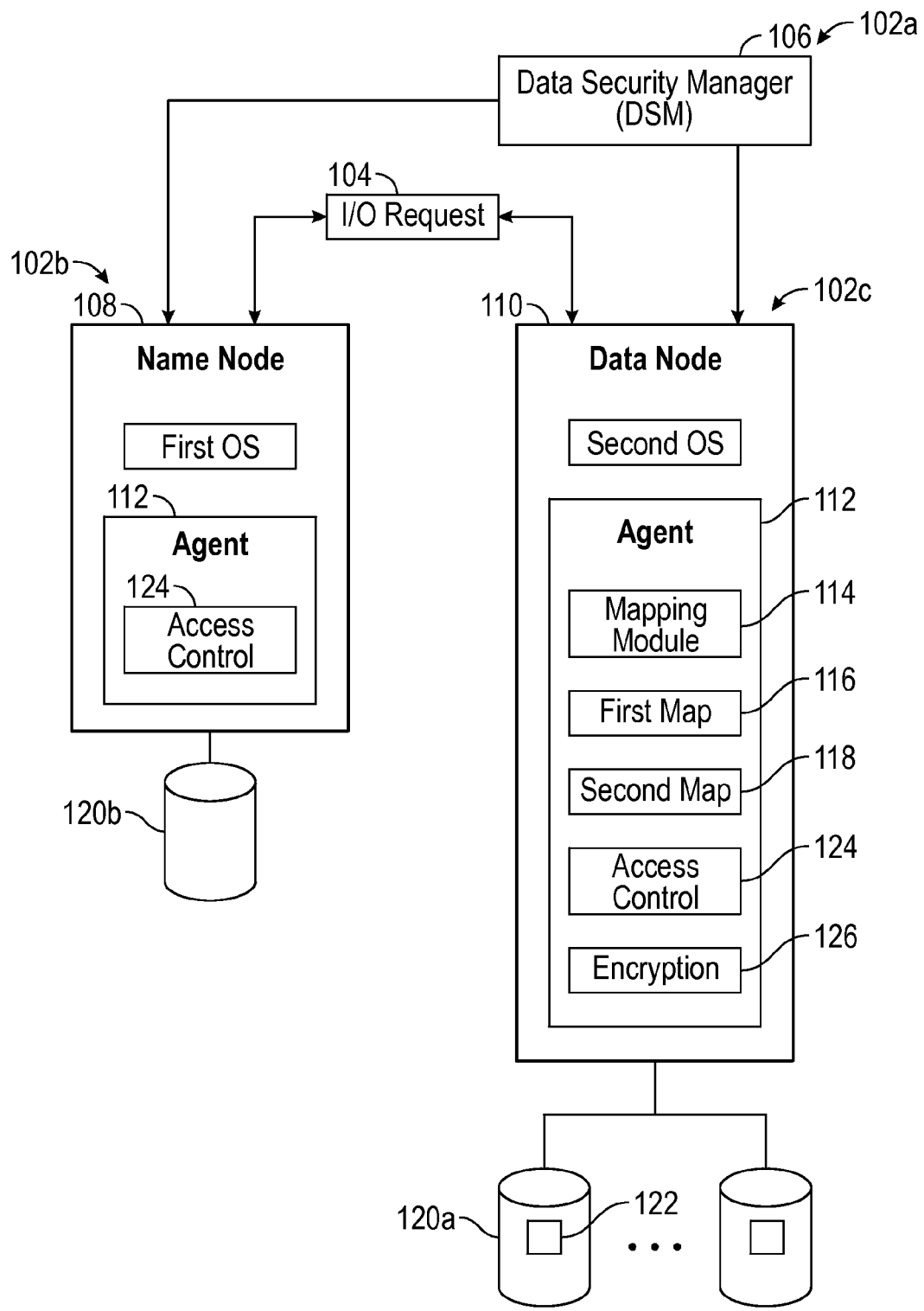
FIG. 1 is a system block diagram of a server with a data security manager, one or more name nodes, one or more data nodes, and a transparent encryption agent in accordance with some embodiments.

A transparent encryption agent disclosed herein operates in a distributed filesystem. The agent can operate in conjunction with one or more name nodes under a first operating system, which could be Hadoop or other operating system suitable for a distributed filesystem, and one or more data nodes under a second operating system, which could be a local filesystem (i.e., a filesystem local to each data node). In one embodiment, the agent is implemented as the Vormetric Transparent Encryption Agent™, which is part of a secure filesystem, secfs, that operates with the Data Security Manager™ of the assignee of the present application. In various embodiments, the agent is installed above, alongside, or below a filesystem on a server or a virtual machine, to enforce security policies. It should be appreciated that secfs is a loadable kernel module and may be embodied as the agent in some embodiments. The secfs module is a file system layer that enforces an access and encryption policy upon selected data on end-user systems in some embodiments. The policy specifies a key to be used when writing data to disk and while reading data from disk. Further details on the secure file system secfs of the assignee may be found in application Ser. No. 14/015,954, which is incorporated by reference for all purposes.

The embodiments provide that when an I/O (input/output) request is made for a data block, identified by a block filename in the second operating system, the agent determines the corresponding filename in the first operating system, and a username for the I/O request. The agent then determines an access control rule applicable to the file having that filename in the first operating system. The agent applies the access control rule to the data block, which confirms or denies access to the data block specified in the I/O request, based on whether the username is allowed access according to the access control rule. If access is allowed, encryption or decryption is applied to the data block by the agent. It should be appreciated that these processes are transparent to the user and the I/O request in some embodiments.

Examples of terminology for one filesystem in one embodiment are provided below. It should be appreciated that further embodiments are applicable to further filesystems and operating systems as the terminology is not meant to be limiting. An HDFS namespace may refer to a hierarchy of files and directories in HDFS. Files and directories are represented on the name node by inodes in some embodiments. A HDFS Client may refer to the client end of HDFS that interacts with an HDFS name node and data node through class DistributedFileSystem. A HDFS administrator may refer to a super-user with the same identity as the name node process itself; the super-user can do anything in that permissions checks never fail for the super-user. By default the super-user identity is hdfs. A HDFS block refers to the content of an HDFS file split into large blocks. Typically each block is up to 128 megabytes, although other sizes could be used. A HDFS block file refers to the underlying local filesystem file that stores a single HDFS Block. Each HDFS block has an associated name in the local file system. A HDFS pool ID refers to an identifier that uniquely identifies the block pool that belongs to a single HDFS namespace. A HDFS block ID refers to an identifier that uniquely identifies a block that belongs to a block pool.

Examples of Data Security Transparent Encryption Terminology relating to the assignee includes the Transparent Encryption Agent, which refers to a kernel mode component installed above the file system to apply encryption key and security rules to filesystem I/Os. A user mode component of the transparent encryption refers to a user mode component to handle a request from the Transparent Encryption Agent. The Data Security Manager refers to a repository that centralizes policy control and key management for transparent encryption.

FIG. 1 is a system block diagram of servers 102a-c in a distributed environment. Server 102a includes data security manager 106. Server 102b includes one or more name nodes 108 having data storage 120b. Server 102c includes one or more data nodes 110 and a transparent encryption agent 112 in accordance with some embodiments. The agent 112 has a mapping module 114, a first map 116, a second map 118, an access control engine 124 and an encryption engine 126. The first map 116 is relative to the first filesystem, and associates filenames in one or more namespaces in the first filesystem with owners of the files, access control rules, and encryption keys. The second map 118 is relative to both the first filesystem and the second filesystem, and associates filenames in the one or more namespaces in the first filesystem with block filenames of data blocks in one or more namespaces in the second filesystem. In some embodiments, the second map 118 maps a pool ID, of a block filename in the second filesystem, to a name node or a hostname of a name node, as explained further below.

Data blocks 122 are written to and read from data storages 120a, which are coupled to the server 102c. It should be appreciated that the data storages 120a need not be physically proximate to the server 102c, and could be distributed storage, local storage, virtual storage, cloud storage, direct attached storage, and so on. When an I/O request 104 is received by the server 102c, the agent 112 determines the block filename in the second filesystem. The agent 112 then determines the filename in the first filesystem, the owner of that file, and the applicable access control rule. Meanwhile, the username associated with the I/O request 104 is obtained by the agent 112. With this information, the agent 112 applies the access control rule. The agent 112 uses the access control engine 124, and confirms or denies access to the data block referenced by the I/O request 104, with encryption or decryption, using the encryption engine 126, as appropriate. For example, if the user that made the I/O request 104 is the same as the owner, the access control rule would allow access, with encryption for a data write or decryption for a data read. Rules and policies for individual ownership and access and/or group ownerships and access, and combinations thereof, are readily devised and applied in accordance with the teachings herein.

Figure 2:
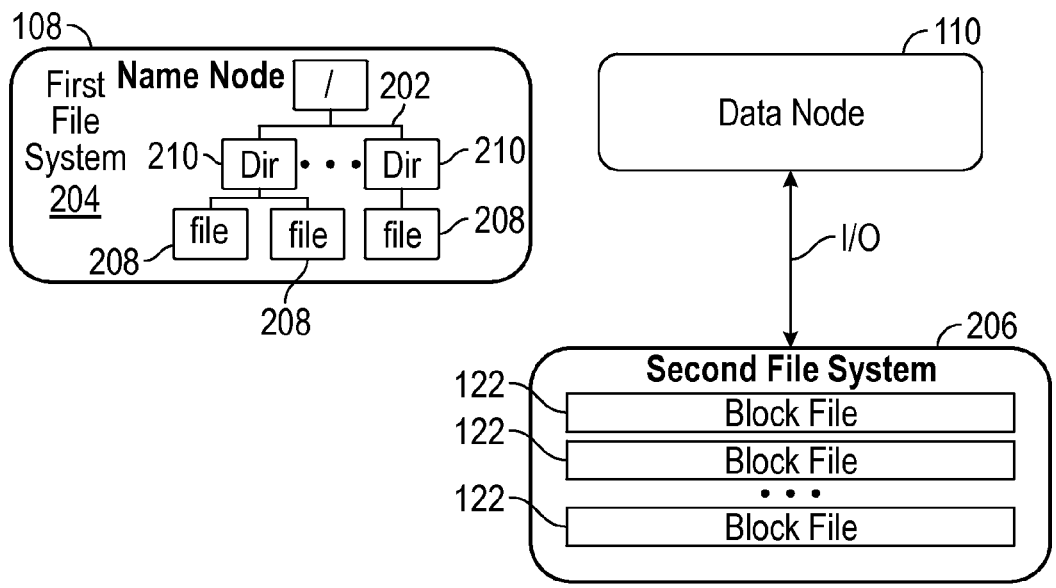
FIG. 2 depicts a name node, with a first filesystem, and a data node, with a second filesystem in accordance with some embodiments.

FIG. 2 depicts a name node 108, with a first filesystem 204, and a data node 110, with a second filesystem 206 in accordance with some embodiments. The relationship of data across the two filesystems 204, 206, in a distributed filesystem, explains how a block filename in a namespace in the second filesystem 206 is mapped to a filename in a namespace in the first filesystem 204. A distributed filesystem, such as HDFS, has name nodes 108 and data nodes 110. A name node 108 keeps a directory tree 202 of all the files 208 in the namespace in the first filesystem 204. A data node 110 stores the data of these files 208 in a local filesystem, the second filesystem 206, which is local to the data node 110. The content of a file in a distributed filesystem is split into one or more large blocks in some embodiments. Typically, each block is up to 128 MB (megabytes), although other sizes can be used. Each data block is stored as a block file 122 in the local filesystem, i.e., the second filesystem 206. Thus, one or more block files 122 in the second filesystem 206 may correspond to one file 208 in the first filesystem 204.

Figure 3:
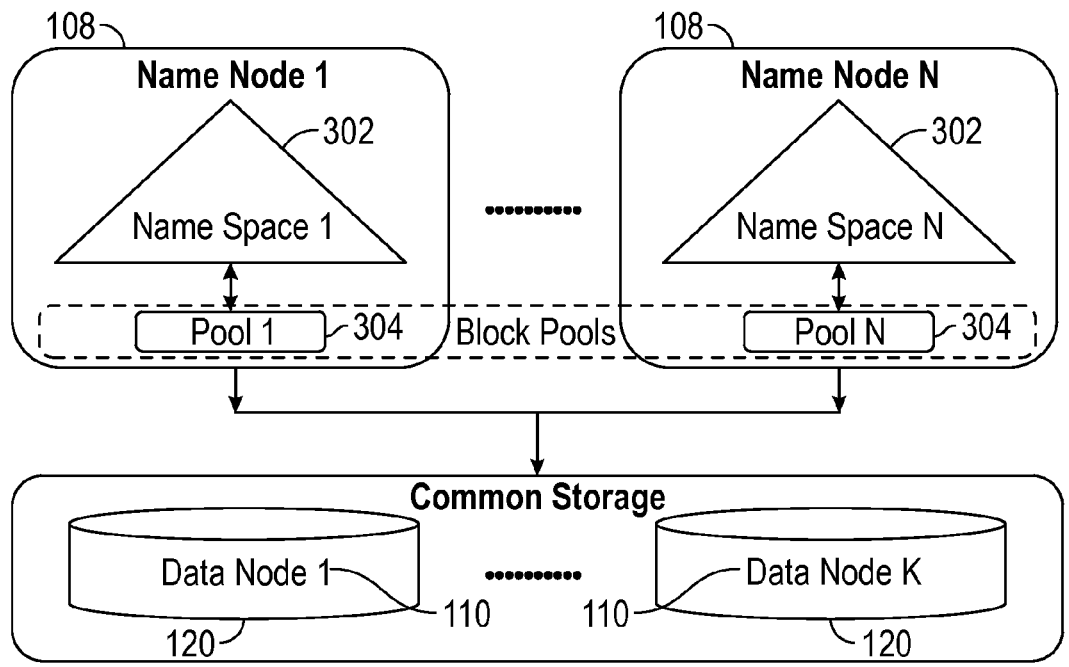
FIG. 3 shows the relationship of data block pools to namespaces in name nodes in accordance with some embodiments.

FIG. 3 shows the relationship of data block pools 304 to namespaces 302 in name nodes 108 in some embodiments. A block pool 304 is a set of blocks 122 (i.e., data blocks 122) that belong to a single name node 108 and namespace 302. Each name node 108 has a namespace 302, and each namespace 302 corresponds to a name node 108. Data nodes 110 store the data blocks 122, as block 122 files, for all the block pools 304 in a cluster in some embodiments. A namespace 302 generates block IDs (identifiers) for new blocks 122 without need for coordination with other namespaces 302.

Figure 4:
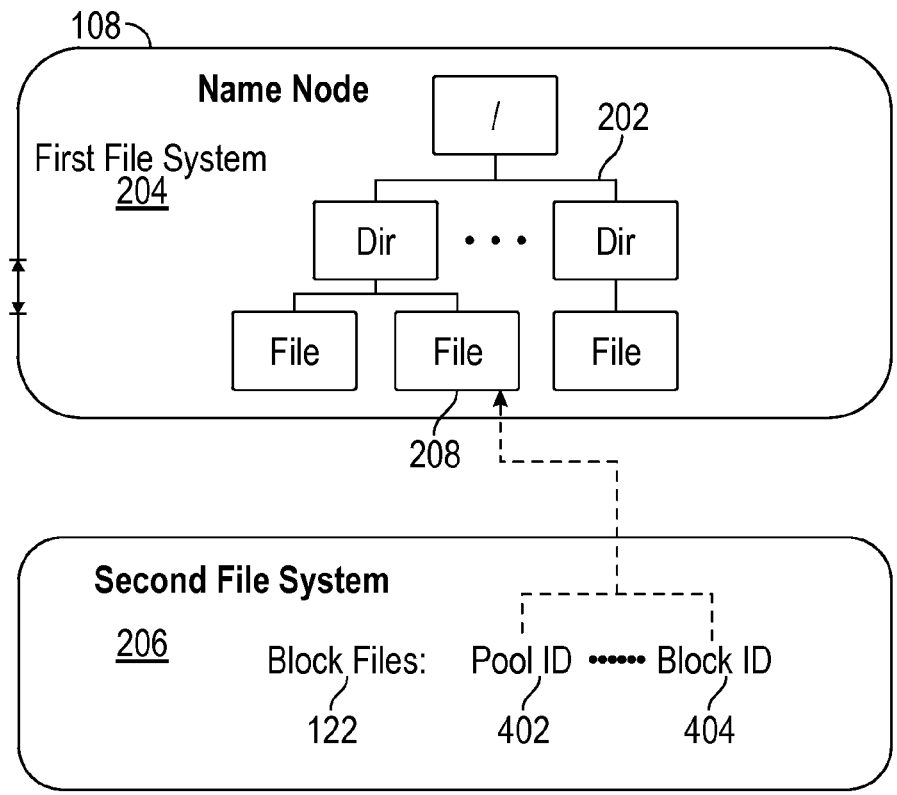
FIG. 4 shows the relationship of a data block file, with a pool ID and a block ID in the second filesystem, to a filename in the first filesystem in accordance with some embodiments.

FIG. 4 shows the relationship of a data block 122 file, with a pool ID 402 and a block ID 404 in the second filesystem 206, to a filename in the first filesystem 204 in some embodiments. Each block 122 filename contains a pool ID 402 and a block ID 404. The pool ID is uniquely related to the name node 108 and corresponding namespace 302. The block ID 404 is uniquely related to a filename within a name node 108 and corresponding namespace 302. The combination of a pool ID 402 and a block ID 404 is globally unique, so there is a one-to-one relationship between the block 122 filename in the second filesystem 206 and the filename in the first filesystem 204, when the file is smaller than one block. In other words, a single block 122, with a filename and the second filesystem 206, maps to a single file with a filename in the first filesystem 204. When the file is larger than one block, there is a many-to-one relationship between the filenames of the blocks 122 in the second filesystem 206 that are split out from the file, and the filename in the first filesystem 204. In other words, multiple blocks 122, with filenames in the second filesystem 206, map to a single file with a filename in the first filesystem 204.

Figure 5:
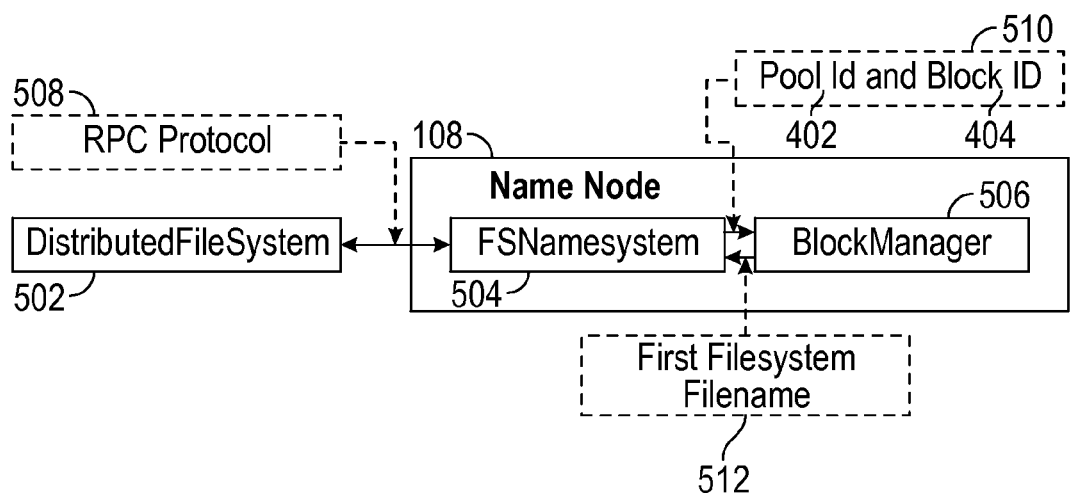
FIG. 5 shows a name node obtaining a filename relative to the first filesystem, from a pool ID and block ID relative to the second filesystem in accordance with some embodiments.

FIG. 5 shows a name node 108 obtaining a filename relative to the first filesystem 204, from a pool ID 402 and block ID 404 relative to the second filesystem 206. Prior to development of embodiments for the present disclosure, HDFS did not have an API (application programming interface) to obtain an HDFS file name based on the HDFS pool ID 402 and block ID 404. A new method public String getFileName(String poolId, long blockId) is added into the HDFS Java client API class DistributedFileSystem. This method enhances the HDFS client, communication and name node components (e.g., FSNamesystem) 504 to get the HDFS filename (e.g., the first filesystem filename 512) from the name node 108 blockManager 506, based on the pool ID 402 and the block ID 404. For example, the distributed filesystem 502 follows the remote procedure call (RPC) protocol 508 in communicating with the name node 108. The first filesystem 204 client, communication and name node components are collectively shown in FIG. 5 as the filesystem name system 504. These send the pool ID 402 and block ID 404 as parameters 510 to the block manager 506, and receive back the first filesystem filename 512. With reference back to FIG. 1, this can be accomplished with the use of the second map 118.

Figure 6:
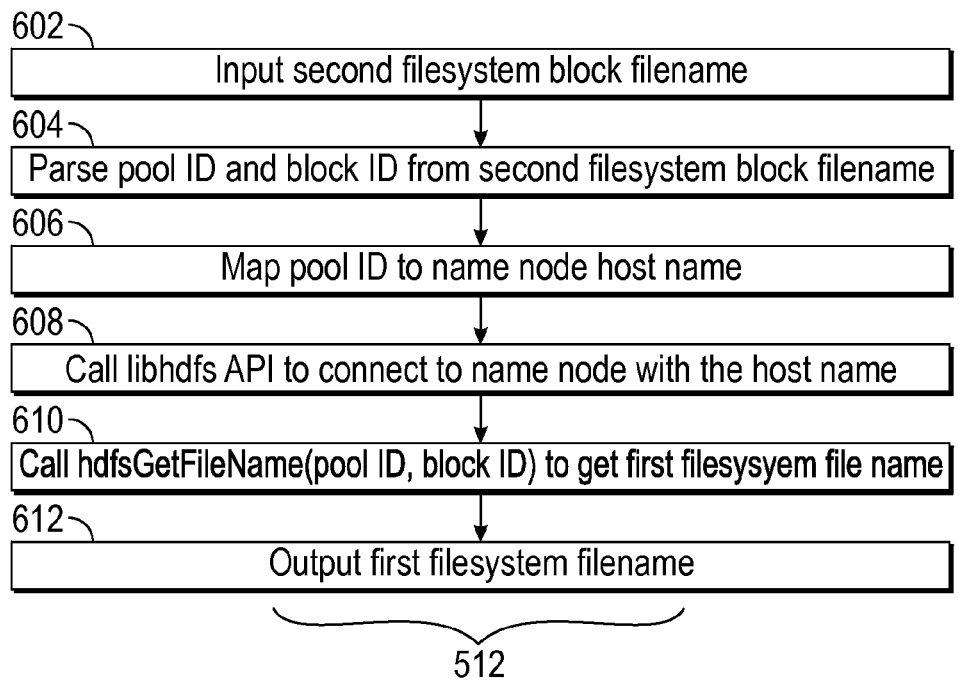
FIG. 6 is a flow diagram showing a workflow of a mapping module in the transparent encryption agent of FIG. 1 in accordance with some embodiments.

FIG. 6 is a flow diagram showing a workflow of the mapping module 114 in the transparent encryption agent 112 of FIG. 1. In the embodiment shown, in order for a C module to call the mapping service, a JNI based C wrapper function char* hdfsGetFileName(hdfsFS fs, char* poolId, int64_t blockId) is added on top of getFileName into the HDFS C library libhdfs. The functions getFileName and hdfsGetFileName do not map the HDFS pool ID 402 to the HDFS name node 108. The pool ID 402 parameter for those two functions is only used for the HDFS name node 108 to validate the call. The HDFS pool ID 402 to HDFS name node 108 mapping is done in a user mode component of the transparent encryption agent 112, as will be further explained with reference to FIG. 10. In some embodiments, the user mode component of the transparent encryption agent 112 has a mapping module 114 to serve the request of getting the HDFS filename from the HDFS block 122 filename.

Although the flow diagram of FIG. 6 provides an example with HDFS and specific function names, the method depicted in FIG. 6 is applicable to other filesystems and operating systems and is not limited to HDFS. In an action 602, the block filename is input to the mapping module 114. The mapping module 114 parses a pool ID and a block ID from the block filename, in an action 604. The pool ID is mapped to the hostname of the name node, in an action 606. An API function, e.g., libhdfs, is called to connect to the name node that has the hostname, in an action 608. A function, e.g., hdfsGetFileName (pool ID, block ID), is called to get the filename in the first filesystem, from the pool ID and the block ID, in an action 610. This function applies the first map 116, as depicted in FIG. 1. The filename in the first filesystem is output, in an action 612.

Figure 7:
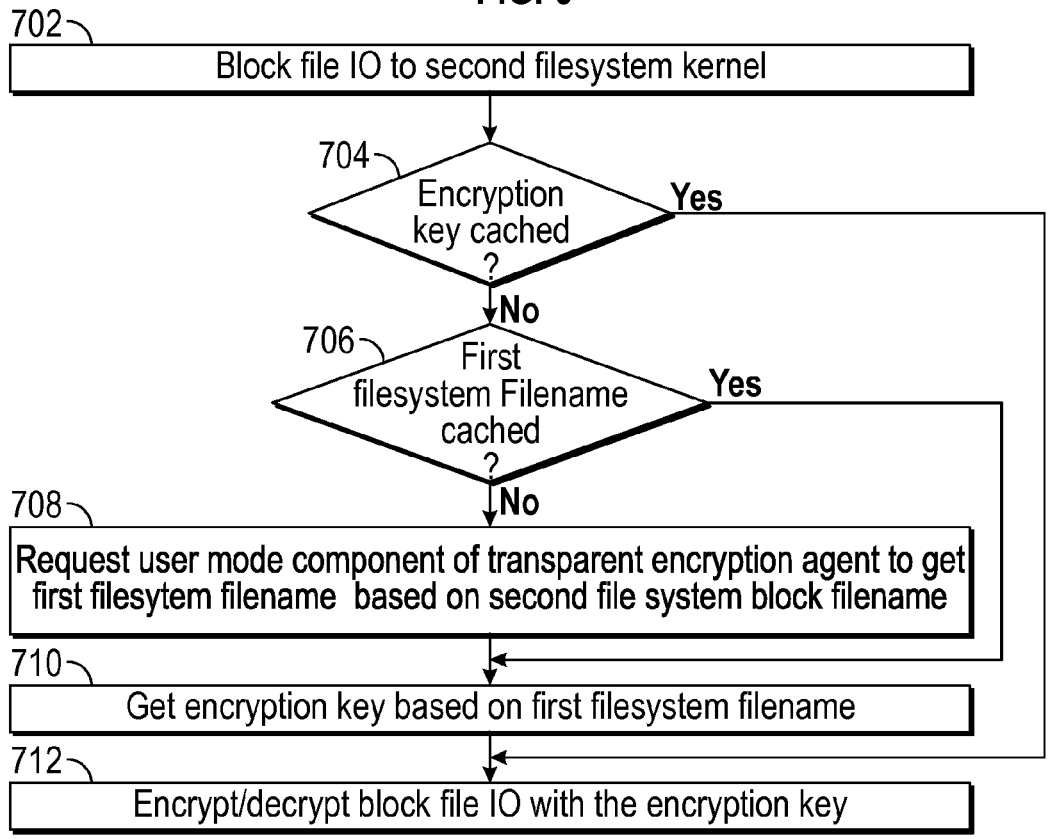
FIG. 7 is a flow diagram showing a workflow of the transparent encryption agent of FIG. 1, obtaining and applying an encryption key in accordance with some embodiments.

FIG. 7 is a flow diagram showing a workflow of the transparent encryption agent 112 of FIG. 1, obtaining and applying an encryption key. Applying this method, the agent 112 defines an encryption key for the file that has the filename in the namespace in the first filesystem, and applies the encryption key to encrypt or decrypt the related block file in the local filesystem kernel, i.e., in the second filesystem. The owner of the file, i.e., the user or process that originally writes the file or which has otherwise been designated the owner, defines the encryption key for the file in the namespace in the first filesystem 204. In some embodiments, this is performed through a data security manager 106 policy or policies. A map that associates the filename in the first namespace and the encryption key is pushed from the data security manager 106 to the transparent encryption agent 112. In some embodiments, this is the first map 116. In some embodiments, the agent 112 forms the first map 116 based on input from the data security manager 106. The agent 112 may run in the data node 110 in some embodiments. The agent 112 intercepts local filesystem calls, for example an I/O read and write operations, obtains the filename in the first filesystem 204 from the block filename in the second filesystem 206, maps the filename in the first filesystem 204 to the encryption key, and applies the encryption key to the block file.

Continuing with FIG. 7, the block file I/O request is sent to the kernel of the second filesystem, in an action 702. For example, this could be read and write operations from an I/O thread in the data node in some embodiments. In a decision action 704, it is determined whether the encryption key is cached. If the encryption key is cached, flow branches to the action 712. If the encryption key is not cached, flow continues to the decision action 706. In the decision action 706, it is determined whether the filename in the first filesystem is cached. If the filename in the first filesystem is cached, flow branches to the action 710. If the filename in the first filesystem is not cached, flow continues to the action 708. The decision actions 704, 706 could be performed in the reverse order, in variations.

In action 708, a user mode component of the transparent encryption agent is requested to get the filename in the first filesystem, based on the block filename in the second filesystem. This action can be fulfilled using the second map. In action 710, the agent obtains the encryption key, based on the filename in the first filesystem. This action can be fulfilled using the first map. In an action 712, the agent encrypts or decrypts the block file I/O with the encryption key, i.e. encrypts or decrypts the data block referenced in the block file I/O request.

Figure 8:
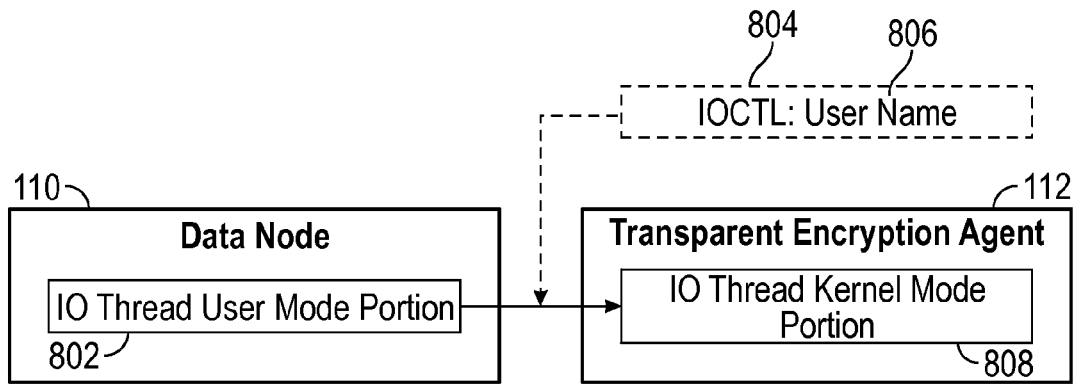
FIG. 8 is a flow diagram of a data node issuing an I/O control call, from which a username is obtained in accordance with some embodiments.

FIG. 8 is a flow diagram of a data node 110 issuing an I/O control call that has a thread context structure 804, from which a username 806 is obtained. The username 806, which is used to issue the I/O request (i.e., referencing the block file) from the data node 110, is passed from the data node 110 to the local filesystem kernel, i.e., to the kernel of the second filesystem 206. Username 806 is used for access control. For example, username 806 is compared to the access rule, in order to determine whether access is granted or denied, and whether encryption is applied.

Without modification, the I/O thread on the data node 110 does not use the credentials of the user requested the services, i.e., the data block I/O request. For example, in Hadoop, the HDFS data node 110 process credential is always hdfs. In order to propagate the username, code is added to the I/O thread that calls into the local filesystem, e.g., the second filesystem 206. This code obtains the username 806. In one embodiment, the code gets the username from the data member userId of the HDFS Java class BlockTokenIdentifier, and passes the username 806 to the transparent encryption agent 112 running in the local filesystem kernel, i.e., running in the second filesystem 206. The agent 112 parses the thread context structure 804 and saves the username 806. This modification is shown in FIG. 8 as the I/O thread user mode portion 802, in the data node 110, sending the thread context structure 804, containing the username 806, to the I/O thread kernel mode portion 808 in the transparent encryption agent 112.

Figure 9:
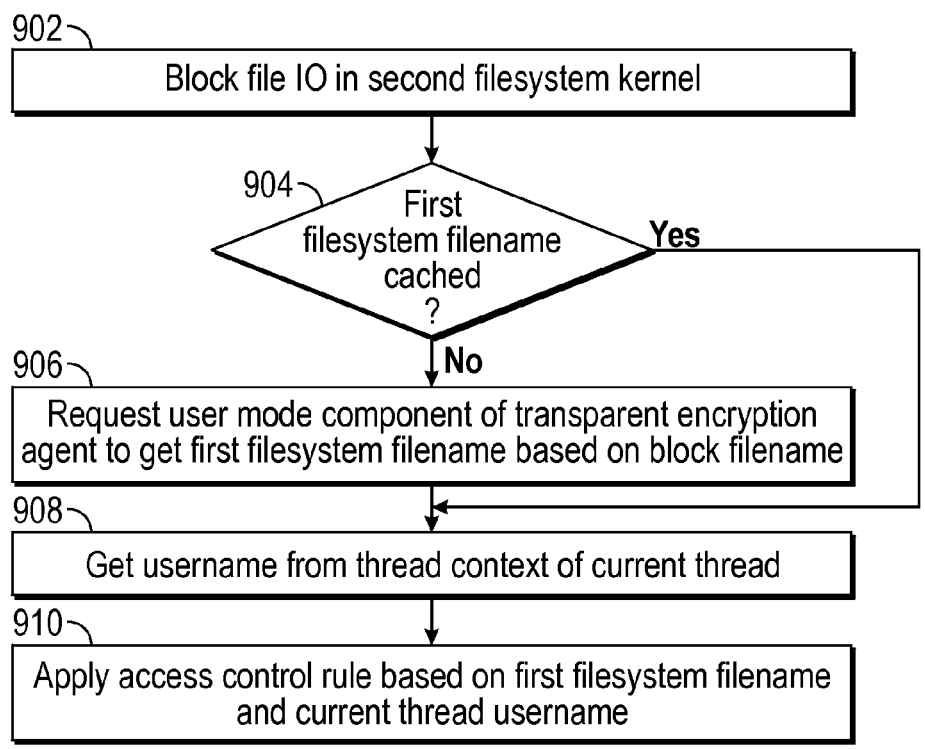
FIG. 9 is a flow diagram showing a workflow of the transparent encryption agent of FIG. 1, obtaining a username and applying access control in accordance with some embodiments.

FIG. 9 is a flow diagram showing a workflow of the transparent encryption agent of FIG. 1, obtaining a username and applying access control. Access control rules for files in the namespace in the first filesystem are defined and applied to related block files in the second filesystem, i.e., the local filesystem. The user defines the access control rule for the file in the namespace in the first filesystem, relative to the name node. In some embodiments, this is done through the data security manager 106 of FIG. 1. The access control rule is pushed from the data security manager to the transparent encryption agent. The agent intercepts the local filesystem call, e.g., read and write operations. This can be performed using the second map. The agent obtains the username from the thread context structure of the current thread, and applies the access control rule against the filename in the first filesystem and the username. The agent can perform these functions by following the method depicted in FIG. 9, as described below.

The block file I/O is received in the second filesystem kernel, in an action 902. For example, the data node makes read and write calls, referencing the data block. In a decision action 904, it is determined whether the filename in the first filesystem is cached. If the filename in the first filesystem is cached, flow proceeds to the action 908. If the filename in the first filesystem is not cached, flow proceeds to the action 906.

In the action 906, the user mode component of the transparent encryption agent is requested to get the filename in the first filesystem, based on the block filename in the second filesystem. This can be performed using the second map. In an action 908, the username is obtained from the thread context of the current thread. This can be performed using the mechanism depicted in FIG. 8, in which the data node sends the thread context structure to the agent. In the action 910, the access control rule is applied, based on the filename in the first filesystem and the username in the current thread. For example, the username can be compared to the access control rule, and access can be confirmed or denied, with encryption, as appropriate.

Figure 10:
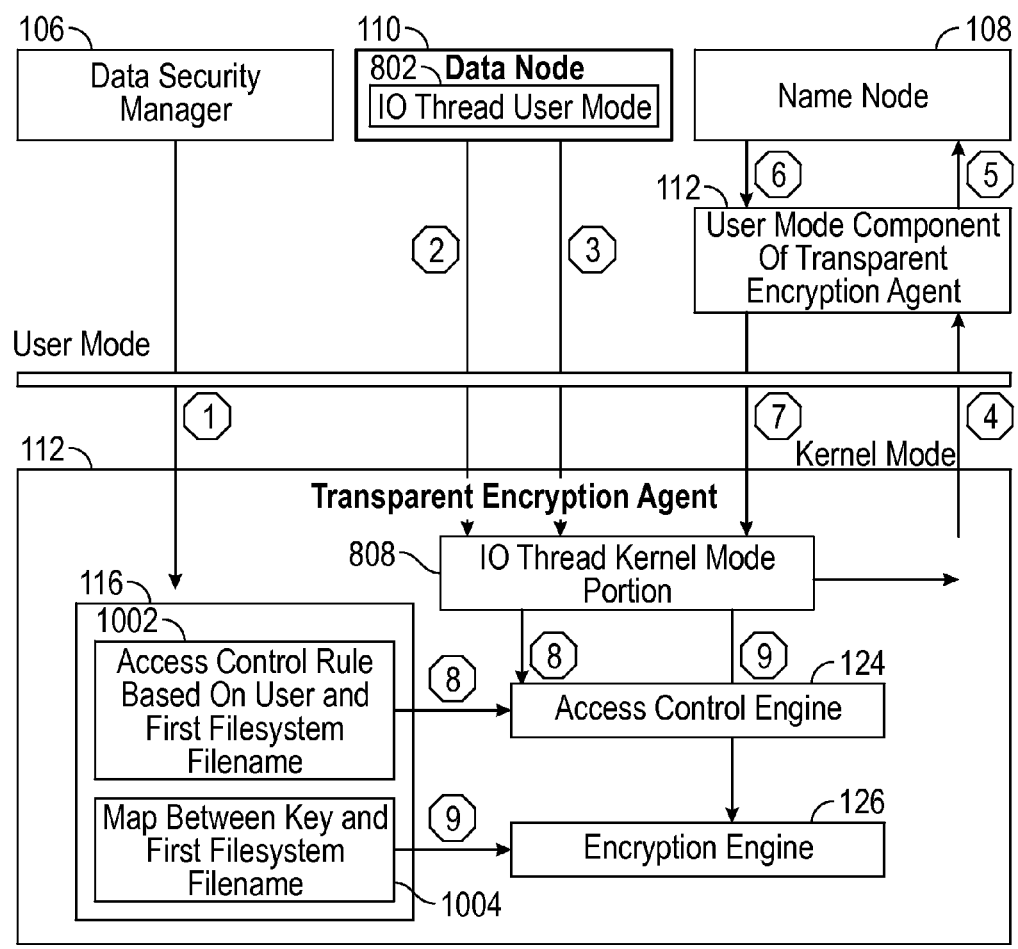
FIG. 10 is an architecture diagram depicting operation of the transparent encryption agent of FIG. 1, in interactions with the data security manager, a data node and a name node in accordance with some embodiments.

FIG. 10 is an architecture diagram depicting operation of the transparent encryption agent 112 of FIG. 1, in interactions with the data security manager 106, a data node 110 and a name node 108. With reference back to FIGS. 1-9, and corresponding descriptions, FIG. 10 combines various mechanisms and process flows into the overall architecture of the system. Numbered actions are depicted in numbered octagons in FIG. 10, and described below with the associated numbers in parentheses.

(1) The data security manager 106 pushes the first map 116 to the agent 112. The first map 116 maps between one or more encryption keys, one or more filenames in the first filesystem, and one or more access control rules, which is illustrated in FIG. 10 as two portions 1002, 1004 of the first map 116. The first map includes a map portion 1002 having at least one access control rule based on the user and the filename in the first filesystem, and a further map portion 1004 having a map between at least one key and a filename in the first filesystem. In some embodiments, the transparent encryption agent 112 runs in a local filesystem kernel, i.e., in the second filesystem, which is under a data node 110.

(2) In the data node 110 I/O thread user mode portion 802 that will call into the second filesystem, i.e., the local filesystem, the added specific code obtains the username and sends the username to the agent 112 through an I/O control call. In some embodiments, the user name is obtained from BlockTokenIdentifier:userId.

(3) The data node 110 I/O thread calls into the second filesystem, i.e., the local filesystem. The agent 112 intercepts the call and obtains the block filename in the second filesystem.

(4) The agent 112 sends the block filename, in the second filesystem, to the user mode component of the transparent encryption agent 112. In some embodiments, this user mode component of the transparent encryption agent 112 has the mapping module.

(5) The user mode component of the transparent encryption agent 112 parses the pool ID and the block ID from the block filename in the second filesystem. The agent 112, more specifically the user mode component of the encryption engine 126 in some embodiments, maps the pool ID to the name node 108 hostname, and connects to the name node 108 host. In one embodiment, this connection is made through the HDFS C library libhdfs. The agent then sends the pool ID and the block ID to the name node 108. In some embodiments, this is performed through the function getFileName.

(6) The name node 108 serves the request. The name node 108 obtains the filename in the first filesystem based on the pool ID and the block ID. This action is depicted in FIGS. 5 and 6, and can be performed with the assistance of the agent 112, the mapping module and the second map as depicted in FIG. 1.

(7) The user mode component of the transparent encryption agent 112 returns the filename in the first filesystem back to the remainder of the transparent encryption agent 112 operating in the kernel.

(8) The transparent encryption agent 112 applies the access control rule against the username and the filename in the first filesystem. This can be performed by referencing the first map 116 and determining an access control rule associated with the filename in the first filesystem. Then, the agent 112 compares the username to the requirements in the access control rule, and grants or denies access to the data block accordingly.

(9) The transparent encryption agent 112 gets the encryption key, based on the filename in the first filesystem. For example, this can be performed with the use of the first map 116, which indicates an appropriate encryption key associated with the filename in the first filesystem. The encryption key is then applied to the data block referenced in the I/O request, with encryption for a write or decryption for a read. That is, if the data block is being written, encryption is applied, and if the data block is being read, decryption is applied.

Figure 11:
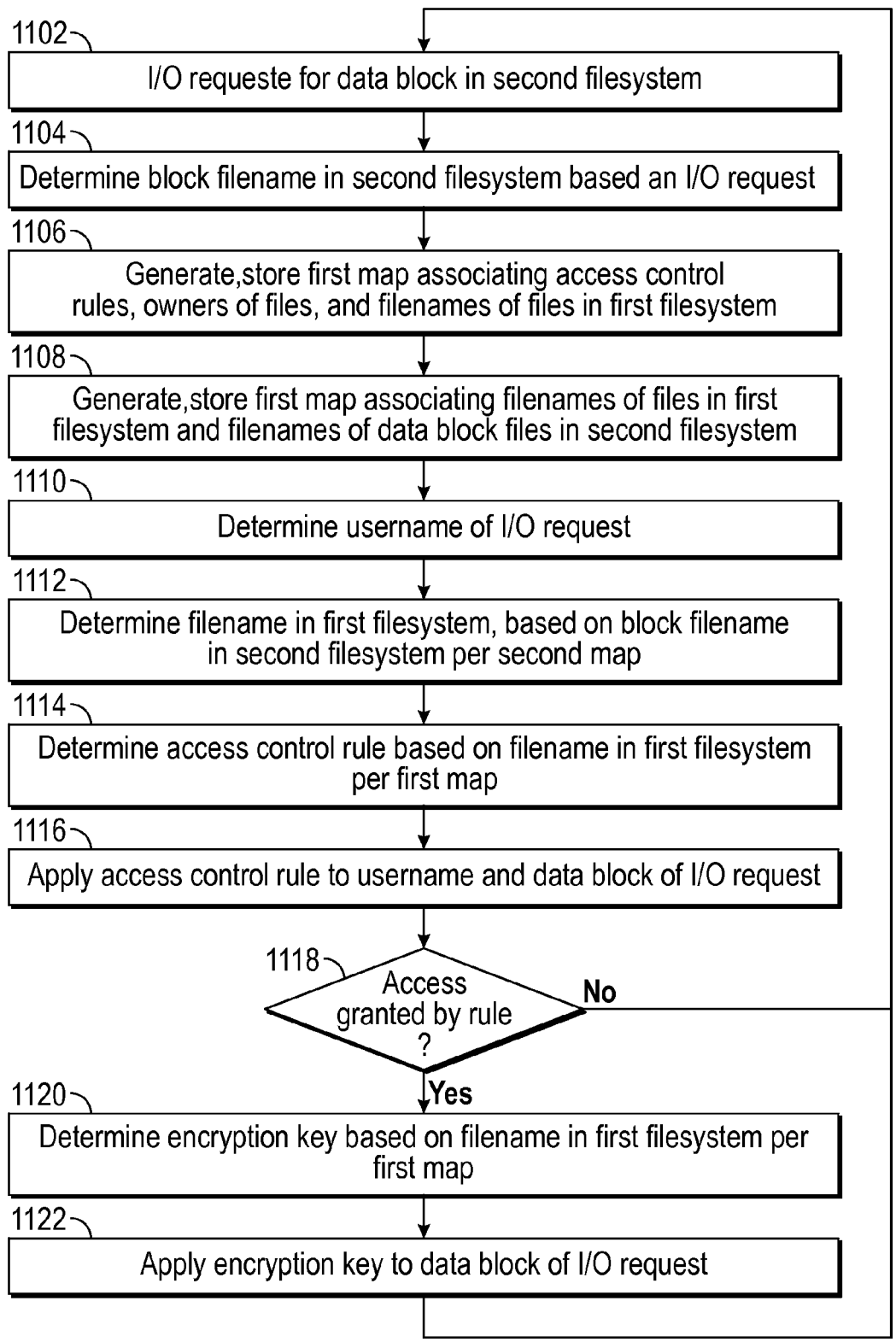
FIG. 11 is a flow diagram showing a method of controlling data access in a distributed filesystem in accordance with some embodiments.

FIG. 11 is a flow diagram showing a method of controlling data access in a distributed filesystem. The method can be practiced on or by a processor, for example a processor in a server in a distributed filesystem environment. In an action 1102, an I/O request is made for a data block in a second filesystem. For example, the I/O request could be or include a read or write operation made from a data node, as illustrated in FIGS. 1 and 10. An appropriate environment for the I/O request is data processing of large amounts of data in a multitenant data processing system, which could include physical computing resources and/or virtual machines implemented with physical computing resources. The I/O request could be relative to physical storage devices, or virtual storage as implemented with physical storage devices.

In an action 1104, a block filename in the second filesystem is determined, based on the I/O request. This is depicted in (3) in FIG. 10, in which a data node I/O thread calls into a local or second filesystem, and the agent intercepts the call and gets the block filename. In an action 1106 a first map is generated and stored. The first map associates access control rules, owners of files, and filenames of files in a first filesystem. For example, the first filesystem could be HDFS and relative to a name node, and the first map could be pushed from a data security manager to a transparent encryption agent, or developed by the transparent encryption agent based on information from the data security manager, as depicted in FIGS. 1-4 and 10. In an action 1108, a second map is generated and stored. The second map associates filenames of files in the first filesystem and filenames of data block files in the second filesystem. For example, the second filesystem could be a local filesystem in a data node. The second map could be developed by the agent.

In an action 1110, the username of the I/O request is determined. This is depicted in (2) in FIG. 10, in which the data node uses specific code to get the username and send the username to the agent. In an action 1112, the filename in the first filesystem is determined, based on the block filename in the second filesystem, which may be based on the second map. FIG. 10, (5) and (6) depict such an action, in which the agent parses the pool ID and the block ID, and the name node gets the filename in the first filesystem namespace. The name node sends this to the agent.

In an action 1114, an access control rule is determined, based on the filename in the first filesystem, per the first map. The first map is depicted in FIGS. 1 and 10, and the access control rule is depicted in FIG. 10, in the map portion 1002. The first map associates access control rules and filenames in the first filesystem, and the agent can consult this first map to determine an appropriate access control rule. In an action 1116, the access control rule is applied to the username and the data block of the I/O request. For example, the agent can determine from the access control rule whether the username is allowed access to the data block. The agent then grants or denies access to the data block accordingly.

In a decision action 1118, is determined whether the rule grants access. If access is denied, flow branches back to the action 1102, for a new I/O request. In variations, if the first map or the second map does not need updating, actions 1104 and/or 1106 could be skipped. If access is granted by the rule, flow proceeds to the action 1120. In the action 1120, encryption key is determined based on the filename in the first filesystem, per the first map. The first map associates encryption keys and filenames in the first filesystem, according to the access rules. If access is granted, the agent can then determine an appropriate encryption key by consulting the first map. In an action 1122, the encryption key is applied to the data block of the I/O request. For example, if the I/O request specifies reading the data block, the agent applies the encryption key to decrypt the data block. If the I/O request specifies writing/reading the data block, the agent applies the encryption key to encrypt/decrypt the data block. The reading or the writing of the data block proceeds via the data storage 120 depicted in FIG. 1, which is coupled to the server 102, e.g., by a network or as direct attached storage. Upon completion of the application of the encryption key, flow proceeds back to the action 1102 for a new I/O request. In variations, further actions could be inserted, or flow could branch elsewhere.

Embodiments described above develop a hybrid data at rest encryption solution for HDFS and other distributed operating systems. The solution defines encryption key and access control rules for files in a namespace in a first operating system, and applies encryption key and access control rules to corresponding data blocks in a second filesystem against the user who issued the I/O request. Data at rest is data residing in a storage under encryption and decryption, as compared to data in transit. Hybrid, as applied herein, refers to a solution crosses the user and kernel boundaries and spaces. The hybrid solution described herein can rotate keys with reencryption on existing files, in some embodiments, and offers security and data control as a result of encryption and access control engines residing in the operating system kernel. This hybrid solution supports encryption selectively on a per file level and can prevent administrators from accessing clear content. One embodiment includes a method to map a block filename, in a namespace in a local or second filesystem to the related filename in a namespace in a first filesystem based on a pool ID and a block ID. This is done by enhancing first filesystem client, communication and name node components to get the filename in the namespace in the first filesystem from the related block filename in the local or second filesystem namespace, based on the pool ID and the block ID in the second filesystem namespace. In another embodiment a method is provided to define an encryption key for a file in a namespace in a first filesystem, and apply the encryption key to encrypt and decrypt a related block file in a namespace in a second or local filesystem kernel. This is based on a mapping between the block filename in the second filesystem, and the filename in the first filesystem. In another embodiment a method is provided to define an access control rule for a file in a namespace in a first filesystem, and apply the access control rule to the related block file in a local or second filesystem kernel, based on the mapping between the block filename in the second filesystem and the filename in the first filesystem. In yet another embodiment a method is provided to apply access control against a user who issues an I/O request. This is done by enhancing a data node to issue an I/O control call from an I/O thread to a transparent encryption agent that runs in a local or second filesystem kernel. The I/O control call gives the transparent encryption agent the username.

Figure 12:
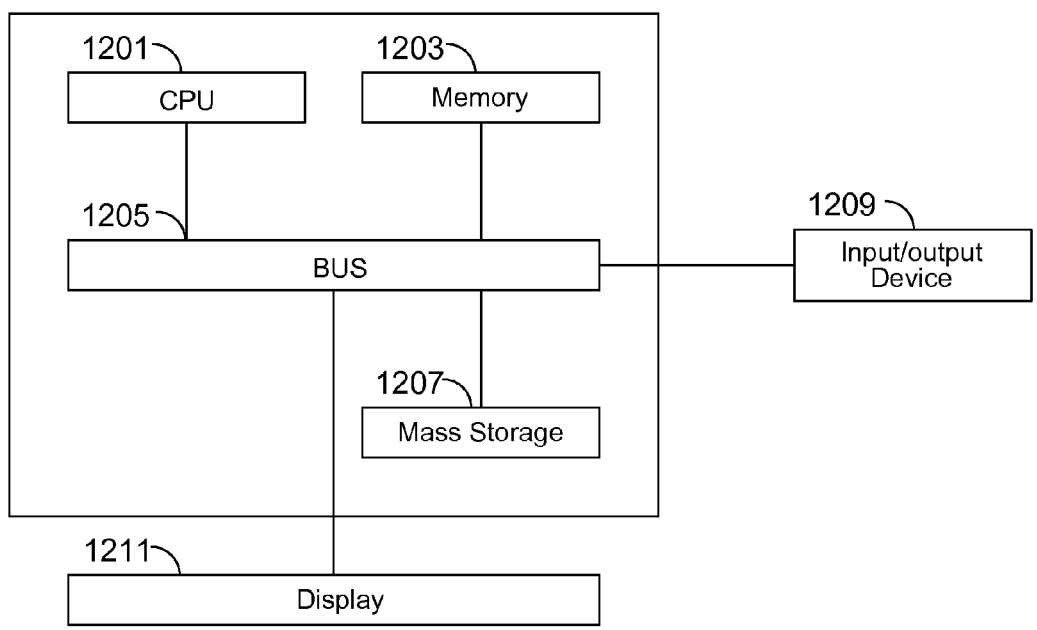
FIG. 12 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 12 is an illustration showing an exemplary computing device which may implement the embodiments described herein. The computing device of FIG. 12 may be used to perform embodiments of the functionality for access control for data blocks in accordance with some embodiments. The computing device includes a central processing unit (CPU) 1201, which is coupled through a bus 1205 to a memory 1203, and mass storage device 1207. Mass storage device 1207 represents a persistent data storage device such as a floppy disc drive or a fixed disc drive, which may be local or remote in some embodiments. The mass storage device 1207 could implement a backup storage, in some embodiments. Memory 1203 may include read only memory, random access memory, etc. Applications resident on the computing device may be stored on or accessed via a computer readable medium such as memory 1203 or mass storage device 1207 in some embodiments. Applications may also be in the form of modulated electronic signals modulated accessed via a network modem or other network interface of the computing device. It should be appreciated that CPU 1201 may be embodied in a general-purpose processor, a special purpose processor, or a specially programmed logic device in some embodiments.

Display 1211 is in communication with CPU 1201, memory 1203, and mass storage device 1207, through bus 1205. Display 1211 is configured to display any visualization tools or reports associated with the system described herein. Input/output device 1209 is coupled to bus 1205 in order to communicate information in command selections to CPU 1201. It should be appreciated that data to and from external devices may be communicated through the input/output device 1209. CPU 1201 can be defined to execute the functionality described herein to enable the functionality described with reference to FIGS. 1-11. The code embodying this functionality may be stored within memory 1203 or mass storage device 1207 for execution by a processor such as CPU 1201 in some embodiments. The operating system on the computing device may be, MS-WINDOWS™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for access control of data in a filesystem, comprising:
   storing a first map in a server, the first map coupled to an agent executing in the server, the first map associating access control rules, filenames in a namespace in a first filesystem that is a distributed filesystem for one or more name nodes, and owners of files;
   storing a second map in the server, the second map coupled to the agent, the second map associating the filenames from the first filesystem with block filenames of data blocks in a namespace in a second filesystem;
   determining a block filename, for a data block, in the namespace in the second filesystem, based on an I/O (input/output) request from a data node to the second filesystem regarding the data block;
   determining a username of the I/O request;
   with the second map, determining a filename in the namespace in the first filesystem, based on the block filename in the namespace in the second filesystem, and responsive to determining the block filename; and
   applying to the data block and the username an access control rule that the map associates with an owner of a file having the filename in the namespace in the first filesystem, wherein at least one action of the method is performed by a processor in the server.

2. The method of claim 1, wherein the map further associates encryption keys with the access control rules, the filenames in the namespace in the first filesystem and the owners of the files.

3. The method of claim 1, wherein applying the access control rule to the data block includes allowing or denying access to the data block based on a comparison of the username of the I/O request and the owner of the file having the filename in the namespace in the first filesystem.

4. The method of claim 1, wherein the I/O request spawns an I/O thread in the data node, and wherein the username is determined from the I/O thread.

5. The method of claim 1, wherein applying the access control rule includes applying an encryption key to the data block, for encryption or decryption, the encryption key specified by the access control rule for use on the file having the owner and the filename in the namespace in the first filesystem.

6. The method of claim 1, wherein determining the filename in the namespace in the first filesystem includes the agent applying a mapping module that maps block filenames, including pool IDs and block IDs, in the namespace in the second filesystem to filenames in the namespace in the first filesystem.

7. A tangible, non-transitory, computer-readable media having instructions thereupon which, when executed by a processor, cause the processor to perform a method comprising:
- establishing in a data node an I/O (input/output) thread associated with a username and regarding a data block, responsive to an I/O request, the data block having a block filename in a namespace in a local filesystem relative to the data node, the block filename having a pool ID (identifier) and a block ID, which identify the data block;
- mapping the block filename in the namespace in the local (second) filesystem to a filename in a further namespace relative to a name node and having a directory structure in a further (first) filesystem that is a distributed filesystem;
- determining the filename, relative to the distributed filesystem, responsive to obtaining the block filename having the pool ID and the block ID, and based on the mapping;
- associating an encryption key and an access control rule to the filename in the further namespace;
- passing the username from the data node to an agent; and
- applying, through the agent, the access control rule and the encryption key to the data block and the username.

8. The computer-readable media of claim 7, wherein the method further comprises:
- determining that the access control rule is applicable to the data block by the association of the access control rule to the filename in the further namespace and the mapping the block filename in the namespace in the local filesystem to the filename in the further namespace.

9. The computer-readable media of claim 7, wherein applying the access control rule includes:
- determining, in accordance with the access control rule, whether access to the data block is allowed for the username; and
- applying the encryption key to the data block, for encryption or decryption, responsive to determining that access to the data block is allowed for the username.

10. The computer-readable media of claim 7, wherein the mapping further comprises:
- receiving, at the agent, the block filename from the data node;
- parsing the pool ID and the block ID from the block filename;
- mapping the pool ID to a hostname of the name node;
- connecting to the name node having the hostname;
- calling a function, with the pool ID and the block ID as input parameters to the function, to obtain the filename in the further namespace relative to the name node; and
- outputting the filename in the further namespace, from the name node to the agent.

11. The computer-readable media of claim 7, wherein applying the access control rule and the encryption key further comprises:
- receiving a call for I/O of the data block having the block filename from the data node;
- determining whether the encryption key is cached;
- determining whether the filename in the further namespace is cached;
- requesting to obtain the filename in the further namespace, based on the block filename in the namespace in the local filesystem, responsive to a determination that the filename in the further namespace is not cached;
- obtaining an encryption key based on the filename in the further namespace, responsive to a determination that the encryption key is not cached; and
- encrypting or decrypting the data block with the encryption key.

12. The computer-readable media of claim 7, wherein the method further comprises:
- pushing the access control rule from a data security manager to the agent;
- intercepting, at the agent, a call by the I/O thread to the local filesystem from the data node, regarding the data block;
- determining whether the filename in the further namespace is cached as associated to the block filename in the namespace in the local filesystem;
- requesting the filename in the further namespace, based on the block filename in the namespace in the local filesystem, responsive to determining that the filename in the further namespace is not cached; and
- obtaining the username from a thread context of the I/O thread.

13. The computer-readable media of claim 7, wherein the method further comprises:
- establishing a first map, in or coupled to the agent, that associates a plurality of filenames in the further namespace, a plurality of owners of files, and a plurality of access control rules relative to the plurality of owners and the plurality of filenames in the further namespace; and
- establishing a second map, in or coupled to the agent, that associates the plurality of filenames in the further namespace to a plurality of block filenames in the namespace in the local filesystem, wherein the first map and the second map support a secure filesystem having multitenancy in one or more name nodes and one or more data nodes.

14. A method for access control of data blocks in a filesystem, comprising:
- pushing a first map from a data security manager to an agent, the first map having a plurality of access control rules based on users and filenames in a first distributed filesystem, the first map further having one or more encryption keys and associating the one or more encryption keys to the users and the filenames in the first filesystem;
- in an I/O (input/output) thread in a data node, sending a username to the agent through an I/O control (IOCTL) call;
- in the I/O thread, calling to a second filesystem regarding one or more blocks, the second filesystem having a namespace that references blocks by block filenames;
- in the agent, intercepting the calling to the second filesystem and obtaining a block filename;
- determining, through the agent, a filename of a file in the first filesystem in response to the agent obtaining the block filename in the second filesystem; and
- applying, through the agent, one of the plurality of access control rules, corresponding to the filename of the file in the first filesystem, against the username from the I/O control call.

15. The method of claim 14, further comprising:
obtaining, through the agent, an encryption key based on the filename of the file in the first filesystem; and
applying the encryption key to a data block having the block filename in the second filesystem.

16. The method of claim 14, wherein determining, at the agent, a filename of a file in the first filesystem corresponding to the block filename in the second filesystem further comprises:
sending the block filename from kernel space to user space;
parsing a pool ID (identifier) and a block ID from the block filename;
mapping the pool ID to a hostname of a name node;
connecting from the agent to a host having the hostname of the name node;
sending from the agent the pool ID and the block ID to the host having the hostname of the name node, to request a filename of a file in the first filesystem, wherein the file in the first filesystem corresponds to the one or more blocks in the second filesystem; and
returning from the host having the hostname of the name node to the agent the filename of the file in the first filesystem, responsive to the request for the filename of the file in the first filesystem.

17. The method of claim 14, further comprising:
adding to a client application programming interface (API) or to a library of the first filesystem, a function defined to get a filename from the filenames in the first filesystem based on a pool ID and a block ID relative to the second filesystem.

18. The method of claim 14, wherein the first filesystem is a Hadoop filesystem, the first filesystem is relative to a name node, and the second filesystem is local to the data node.

19. The method of claim 14, wherein the method is implemented in software executing on one or more servers, and wherein the one or more servers comprises the agent, the first filesystem, the second filesystem, a plurality of name nodes, including the name node, and a plurality of data nodes, including the data node.

20. The method of claim 14, wherein a second map is applied to mapping, in the agent, a pool ID to a hostname of a name node.

* * * * *